May 27, 1941.  H. MARUHN  2,243,713

MOTOR DRIVEN VEHICLE

Filed Feb. 20, 1937

INVENTOR:
Herbert Maruhn
By A. A. Dicke
Attorney

Patented May 27, 1941

2,243,713

UNITED STATES PATENT OFFICE 2,243,713

MOTOR DRIVEN VEHICLE

Herbert Maruhn, Bad Cannstatt, Germany, assignor to Daimler - Benz Aktiengesellschaft, Stuttgart-Unterturkheim, Germany Application February 20, 1937, Serial No. 126,915
In Germany February 21, 1936

10 Claims. (Cl. 248—7)

My invention relates to a motor-driven vehicle, and, more particularly, to the suspension of the engine in the frame thereof.

It is common practice to provide for a floating suspension of the engine in the frame by the interposition of resilient supports, such as rubber pads, enabling the engine to oscillate about a substantially longitudinal axis and in lateral and vertical direction within certain limits independently of the frame, whereby the transmission of the vibrations from the engine to the frame and the body of the vehicle is substantially reduced.

In a familiar design, the engine is supported on two rubber bearings, one being provided at the front of the engine near the top thereof and the other one at the rear of the engine block on a lower level. The center of gravity of the engine coincides with or is positioned close to a line which extends substantially through these two rubber bearings within the vertical longitudinal plane of the engine. Owing to this suspension, the engine can oscillate about this line as an axis. The reactionary force which is produced by the torque exerted by the engine on the driving shaft of the vehicle is taken up by an arm extending laterally from the engine to the frame and resiliently anchored thereto by rubber pads.

While the transmission of vibrations to the frame could be materially reduced with this prior construction, it has not been possible to eliminate the transmission of vibrations of a low frequency, such as arise, for instance, when the engine is a four-cylinder Diesel engine idling or operating at a low speed.

The object of my invention is to provide simple and inexpensive means, whereby the transmission of these vibrations may be efficiently reduced and nearly eliminated altogether, particularly when the engine is idling.

I have attained this object by providing for free oscillation of the engine within a limited range. In a preferred embodiment of my invention, the arm extending laterally from the engine to the frame engages between spaced rubber stops mounted thereon and is capable of swinging therebetween as long as the angle of oscillation of the engine does not exceed certain limits. Therefore, the arm will transmit no vibrations to the frame when the engine is idling. When the engine is operating under load, however, the reactionary torque would cause the engine to continuously press its laterally extending arm on one of the two spaced stops in the absence of special provisions and then the arm would no longer have the liberty of free oscillation between the stops. In order to enable the arm under such conditions of operation to automatically adjust itself in dependence of the load of the engine, I prefer to interpose a frictional element in the lost motion connection which is formed between the engine and the frame by the arm and the stops. Preferably, this frictional element is in form of a double-acting hydraulic shock absorber.

Two preferred embodiments of my invention are illustrated in the accompanying drawing.

Figures 1, 2:
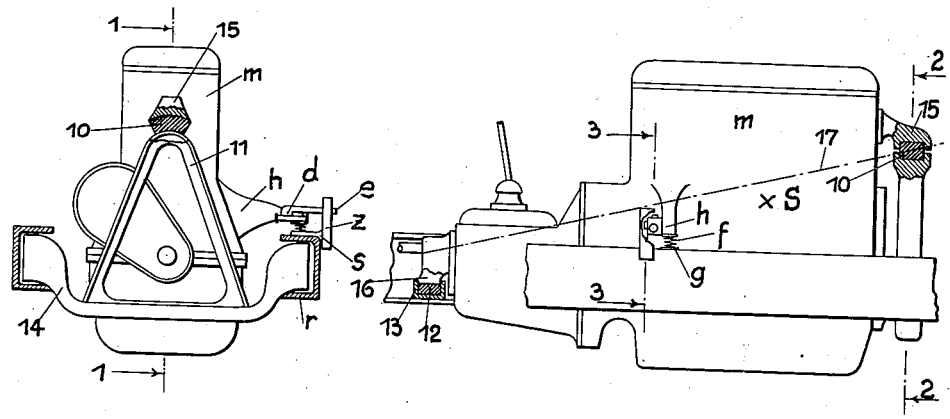
Fig. 1 is a side elevation of the engine and of part of the frame, the rubber bearings being shown in section taken along the line 1—1 of Fig. 2.
Fig. 2 is a front elevation viewed from the right of Fig. 1, partly in section taken along line 2—2 of Fig. 1.

The internal combustion engine $m$ which may be a four-cylinder Diesel engine forming a unitary block with the gear case, is mounted between the two longitudinal beams $r$ of the frame for floating suspension. The suspending means comprise a member 10 of resilient material, preferably rubber, mounted on a frame element 11 and a rubber pad 12 mounted on a frame element 13. The frame element 11 is a triangular bracket extending from a transverse strut 14 of the frame upwardly to a point near the top of the engine where it carries the rubber member 10. The transverse channel member 13 extends between the two opposed lower flanges of the longitudinal beams $r$ of the frame.

Arms 15 and 16 suitably attached to the block engage the rubber pads from above, whereby the engine is so supported that the line 17 extending through the arms 15 and 16 within the central vertical plane of the engine coincides approximately with the center of gravity S and forms an axis about which the engine may oscillate under the periodical reactionary impulses produced by the action of the pistons.

In order to maintain the engine in position, a lateral projection $h$ extends from the casing of the engine above one of the beams $r$ and is formed with a socket 18 at its bottom face engaging a helical spring $f$ which, in its turn, is mounted in a rubber socket $g$ suitably supported on the top of the beam $r$.

When the engine tends under the reaction of its driving torque to turn clockwise about the axis 17 with reference to Fig. 2, the spring $f$ is more or less compressed and permits the reactionary impulses to be taken up by the momentum of the engine block without transmitting them to the frame. In other words, the engine may freely oscillate about the axis 17 within the limits of the expansion and compression of the spring $f$. I have found that while this arrangement is very efficient at relatively high speeds, it fails to prevent transmission of vibrations to the frame and the body of the vehicle when the engine is idling or operating at low speeds. Then it may happen that the engine is subjected to violent oscillations which are transmitted by the spring $f$ to the chassis. In order to preclude such excessive oscillations without affecting the liberty of oscillations of the engine at higher speeds within closer limits, I have additionally provided a lost-motion connection between the frame and the engine. This lost-motion connection constrains excessive oscillation of the engine but does not interfere with smaller oscillations within the limits of the lost-motion.

Figure 3:
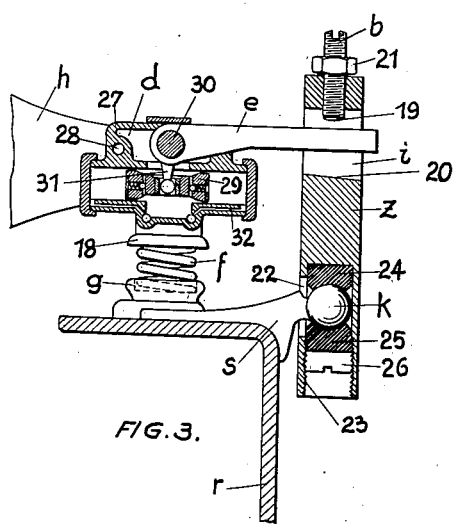
Fig. 3 shows the section taken along the broken line 3—3 of Fig. 1 on an enlarged scale.

This lost-motion connection comprises preferably an arm pivotally mounted on the projection $h$ and a pair of stops or abutments mounted on the frame. One of these stops is formed by the end 19 of an adjustable screw $b$ which is fixed in set position within a holder $z$ by a nut 21 and extends into a slot $i$ in the holder. The other stop or abutment is formed by the bottom 20 of the slot $i$ and the arm $e$ plays between these two abutments 19 and 20 and is normally spaced therefrom, as shown in Fig. 3. The holder $z$ is connected to the frame $r$ by a universal ball joint, the ball $k$ forming part of a bracket $s$ suitably attached to the beam $r$ and extending through an opening 22 into a bore 23 of the holder where it is held in position by two socket members 24 and 25 inserted in the bore and maintained therein by a screw 26. It will appear from the foregoing description that the arm $e$ may freely play within the slot $i$ of the holder $z$ between the stops 19 and 20 without transferring any vibrations to the frame through the holder. Only when the rotary vibration of the engine about the axis 17 becomes excessive, will the arm $e$ engage one or the other or both of the stops 19 and 20 and will thus constrain the swinging motion of the engine to the angle predetermined by the lost-motion or play of the arm $e$ between the stops 19 and 20.

In order to dampen the shocks incident to the engagement of the arm $e$ with the stop 19 or 20, I prefer to insert a frictional element in the lost-motion connection. Preferably, this frictional element is a double-acting hydraulic shock absorber $d$ which is included in the train of the elements $h$, $e$, $z$ and $r$, for instance, between the projection $h$ and the arm $e$. In the embodiment shown, the shock absorber $d$ comprises a housing 27 attached to the projection $h$ by bolts 28 and accommodating a reciprocatory double-acting piston 29.

A horizontal pin 30 is journalled in the housing 27 and forms a bearing for the arm $e$. This arm has a downwardly projecting crank 31 formed with a spherical head engaging between the walls of a vertical slot provided in the piston 29. The two compartments of the shock absorber communicate through narrow conduits 32 in the walls of the housing and are filled with a suitable liquid.

When the engine is operating under load and tends to turn about the axis 17 and to compress the spring $f$, the arm $e$ will engage the stop 20 and will thereby be raised so as to remain at liberty to freely oscillate between the two stops 19 and 20. The raising of the arm causes the piston 29 to move towards the right but the arm is frictionally kept in the position which it assumes relative to the projection $h$ at any time. Therefore, the shock absorber $d$ and the arm $e$ will variably fix the limits of the angle of oscillation of the engine in dependence of the average torque exerted by the engine.

In other words, the arm $e$ constitutes a stop mounted on the engine which cooperates with the stops 19 and 20 mounted on the frame to constrain oscillation of the engine within a limited angle and it is the position of this angle relative to the engine which will be varied by displacement of the piston 29.

Figure 4:
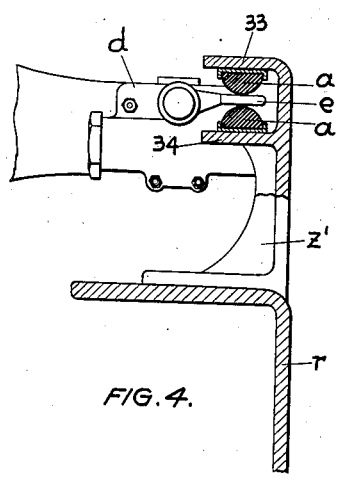
Fig. 4 represents a modified embodiment in a view similar to that of Fig. 3, the shock absorber being shown in elevation.

In Fig. 4 I have shown a slightly modified embodiment of my invention. A bracket $z'$ bolted to the frame $r$ has been substituted for the holder $z$. The bracket is provided with two horizontal flanges 33 and 34 extending above and beneath the arm $e$ of the shock absorber $d$ and provided with opposed semi-spherical rubber pads $a$ which are but slightly spaced from the arm $e$ when the same is in its central position. These rubber pads $a$ will offer but a negligible resistance to slight oscillations of the arm $e$, but will effectively resist larger oscillations of this arm.

The word "frame" as used throughout the specification and claims is not limited to a construction in which such frame is separate from the body or coachwork of the vehicle, but is to include such a construction in which the frame forms a part of or is integral with such body or coachwork.

While I have described two specific embodiments of my invention, I wish it to be clearly understood that the invention is capable of numerous modifications and not limited to the details shown and described. Thus the spring $f$ may be omitted or replaced by a rubber member and the stop member $e$ may be mounted on the frame, while the stops 19 and 20 are provided on the engine, as will readily occur to anyone skilled in the art.

What I claim is:

1. In a suspension system of the class wherein an engine is yieldably mounted in a frame for swinging movement relative thereto, the combination with a shock absorber attached to one of said relatively swinging elements, said shock absorber including a dampening device for absorbing the energy of the swinging movement of the engine, an operating lever for said dampening device, and an abutment device on the other of said relatively swinging elements spaced from and cooperating with said operating lever in such a manner as to permit relatively small free swinging movements of said engine while operating said dampening device through actuation of said lever upon relatively large swinging movements of said engine.

2. The combination according to claim 1 in which said shock absorber is positioned on said motor and said abutment device on said frame.

3. The combination according to claim 1 in which said abutment device comprises rubber buffers.

4. In a suspension system of the class wherein a member subject to periodic oscillatory vibrations of variable amplitude is pivotally supported on a second member, the combination of a shock absorber on said first member, abutting means on said second member, a lever arm cooperating with said abutting means for actuation of said shock absorber only upon predetermined relatively large movements of said first member, and means intermediate said first and second members for absorbing relatively small vibrations of said first member.

5. The combination according to claim 4 in which said last means comprises a spring intermediate said shock absorber and said second member.

6. In a suspension system of the class wherein a motor is swingably mounted relative to a frame, the combination of an oscillation dampener intermediate the motor and the frame on one of those two elements, including dampening means for opposing the swinging energy of the quicker oscillations but yielding to and permitting slower movements, a lever between the motor and frame for actuating said dampening means, said lever being rotatably mounted on one of these two elements, and an abutting device on the other of the two elements cooperating with the said lever with such play that the lever upon larger swinging strokes of the motor relative to the frame is carried against the abutting device, and upon excessive swinging strokes is displaced and thereby actuates the dampening means.

7. In a suspension system of the class wherein a motor is swingably mounted relative to a frame, the combination of an oscillation dampener positioned on the motor, including dampening means for opposing the swinging energy of the quicker oscillations, but yielding to and permitting the slower movements, a lever rotatably mounted on the motor and actuating said dampening means upon its displacement, abutments on the frame cooperating with the lever with such play that the lever upon the larger swinging strokes of the motor relative to the frame is carried against the abutments and upon excessive swinging strokes is displaced and thereby actuates the dampening means.

8. In a motor suspension, the combination according to claim 6, wherein the abutment device comprises two elastic abutments, and the lever actuating the dampening devices extends into the space between these two abutments.

9. In a motor suspension, the combination according to claim 6, wherein the abutment device comprises two elastic abutments having rounded contacting surfaces, and the lever actuating the dampening device extends into the space between these two abutments so that upon swinging movements of the motor relative to the frame, said lever has a rolling contact with the round surfaces of said abutments.

10. The combination according to claim 6, in which said lever is rotatably mounted on said dampener, in combination with a second lever coupling said first lever with said dampening means, the effective length of said second lever being shorter than the effective length of said first lever.

HERBERT MARUHN.